(12) United States Patent
Taft

(10) Patent No.: X7054
(45) Date of Patent: May 11, 1832

(54) PAPER, MANUFACTURING, FOR COVERED BUILDINGS

(76) Inventor: Frederick A. Taft

Frederic A. Taft. of Dedham, Massachusetts.

Letters Patent.

The schedule referred to in these Letters Patent and making part of the same, containing a description in the words of the said Frederic A. Taft, himself of his improvement in the manufacture of Paper, for covering Buildings Be it known that I Frederic A. Taft, of Dedham, in the County of Norfolk, and commonwealth of Massachusetts, Manufacturer, have invented a new and useful improvement in the art of manufacturing paper for covering Buildings and for other purposes, and that the following is an exact description of my new and useful improvement in the art aforesaid. —

My improvement consists in combining Brimstone and Coal, with fibrous substances and making paper from the composition, and cementing the composition together, after the paper is made into sheets, so as it will turn water or make it impenetrable by water, —

The Brimstone may be used without the Coal, and there may be other substances put with it instead of the coal, to give it a body, or the coal may be used without the Brimstone by using some other sulphureous; pitchy or resinous substance, that will cement the composition together

What I claim as my improvement and for which I ask a patent, is the combining Brimstone with coal, either separately or connectively, or when other substances are used with fibrous substances and making paper from the composition for covering buildings, and for other purposes and the cementing said composition after the paper is made into sheets so as it will turn water or be impenetrable by water.

My usual process in the manufacture is to take one part in weight of fibrous stock, two and a half parts brimstone and two parts coal, the brimstone & coal being pulverized. I mix them in the engine commonly used to beat paper stock, and after the stuff is sufficiently beat I make it into sheets in the usual way, paper is made either by hand or by machinery. I sometimes put into the composition one part rosin or other pitchy substance to assist in cementing, I also sometimes put in salt and lime to render it less combustible, –

I am not confined to the above proportions but vary according to the consistence of the paper I wish to make, After the paper is made and dryed, I consolidate and cement the same by rolling it between two metallic cylinders made hot so as to soften or melt the Brimstone, and if I find this process has not sufficiently cemented it, I resort to other methods. I sometimes put the sheets between metallic plates, brought to a degree of heat to melt the brimstone, or they may be put into an oven or other place made sufficiently hot for the purpose.

Witnesses

Enos [illegible] }
Henry Agnes Haughton }

Frederic A. Taft.

480 [illegible]